(12) United States Patent
Gonska et al.

(10) Patent No.: US 11,226,020 B2
(45) Date of Patent: *Jan. 18, 2022

(54) ANTILOCK BRAKE ROTOR ASSEMBLY WITH CORROSION RESISTANT TONE RING

(71) Applicant: Commercial Vehicle Components, LLC, Delray Beach, FL (US)

(72) Inventors: David G. Gonska, Livonia, MI (US); Anthony Guerriero, Novi, MI (US)

(73) Assignee: COMMERCIAL VEHICLE COMPONENTS, LLC, Delray Beach, FL (US)

(*) Notice: Subject to any disclaimer, the term of this patent is extended or adjusted under 35 U.S.C. 154(b) by 150 days.

This patent is subject to a terminal disclaimer.

(21) Appl. No.: 16/711,919

(22) Filed: Dec. 12, 2019

(65) Prior Publication Data

US 2020/0166092 A1    May 28, 2020

Related U.S. Application Data

(63) Continuation-in-part of application No. 16/691,926, filed on Nov. 22, 2019.

(Continued)

(51) Int. Cl.
*F16D 65/00*    (2006.01)
*B29C 64/153*   (2017.01)
(Continued)

(52) U.S. Cl.
CPC .......... *F16D 65/0025* (2013.01); *B22F 10/25* (2021.01); *B29C 64/153* (2017.08);
(Continued)

(58) Field of Classification Search
CPC ............................. F16D 65/0025; B22F 10/25
See application file for complete search history.

(56) References Cited

U.S. PATENT DOCUMENTS

| 4,418,842 A | 12/1983 | Di Loreto |
| 5,739,684 A | 4/1998 | Burns |

(Continued)

FOREIGN PATENT DOCUMENTS

| EP | 1918605 A1 | 5/2008 | |
| IN | 140/MUM/2011 | * 1/2011 | .............. B22F 10/20 |

(Continued)

OTHER PUBLICATIONS

PCT/US19/62745, Notification of the International Search Report and Written Opinion of the International Searching Authority, or the Declaration, dated Feb. 3, 2020, 12 pgs.

(Continued)

*Primary Examiner* — Weiping Zhu
(74) *Attorney, Agent, or Firm* — Patzik, Frank & Samotny Ltd.

(57) ABSTRACT

A brake rotor assembly is provided. The brake rotor assembly includes a brake rotor portion formed from a first material. A tone ring formed from a second material is coupled to the brake rotor portion. The tone ring is formed by an additive manufacturing process, a subtractive manufacturing process, or a combination thereof. The brake rotor portion may be cast from an iron or iron alloy. The tone ring is formed by an additive manufacturing, or 3D printing, process machine from a second material that is corrosion resistive, such as, for example, stainless steel.

16 Claims, 7 Drawing Sheets

Related U.S. Application Data

(60) Provisional application No. 62/771,844, filed on Nov. 27, 2018.

(51) Int. Cl.
  *F16D 63/00* (2006.01)
  *B22F 10/25* (2021.01)
  *B33Y 80/00* (2015.01)
  *B22F 10/66* (2021.01)

(52) U.S. Cl.
  CPC .............. *F16D 63/00* (2013.01); *B22F 10/66* (2021.01); *B33Y 80/00* (2014.12); *F16D 2250/0069* (2013.01)

(56) References Cited

U.S. PATENT DOCUMENTS

| | | |
|---|---|---|
| 6,259,794 B1 | 7/2001 | Dobbins |
| 9,759,281 B1 | 9/2017 | Stratton |
| 2005/0212353 A1 | 9/2005 | Tolani |
| 2006/0272906 A1 | 12/2006 | Gonska |
| 2009/0200258 A1 | 8/2009 | Maeda et al. |
| 2010/0032251 A1 | 2/2010 | Bradley |
| 2011/0259683 A1 | 10/2011 | Hester |
| 2015/0359667 A1 | 12/2015 | Brue |
| 2017/0175834 A1* | 6/2017 | Bracamonte .......... C23C 24/103 |
| 2018/0209498 A1 | 7/2018 | Zandbergen et al. |
| 2018/0313417 A1 | 11/2018 | White |
| 2019/0120312 A1 | 4/2019 | White |
| 2019/0309810 A1 | 10/2019 | Sabeti |
| 2019/0353207 A1 | 11/2019 | Gonska |
| 2020/0166091 A1* | 5/2020 | Gonska ............... F16D 65/0025 |

FOREIGN PATENT DOCUMENTS

| | | |
|---|---|---|
| WO | 2017162559 A1 | 9/2017 |
| WO | 2018154496 A1 | 8/2018 |

OTHER PUBLICATIONS

Mahindra & Mahindra Limted, IN 140/MU/2011 A, Jan. 17, 2011, entire document, 26 pgs. total.

* cited by examiner

ANTILOCK BRAKE ROTOR ASSEMBLY WITH CORROSION RESISTANT TONE RING

CROSS-REFERENCE TO RELATED PATENT APPLICATIONS

This is a continuation in part application of U.S. Non-Provisional application Ser. No. 16/691,926, filed Nov. 22, 2019, which application claims priority to and the benefit of U.S. Provisional Application No. 62/771,844, filed Nov. 27, 2018, entitled ANTILOCK BRAKE ROTOR ASSEMBLY WITH CORROSION RESISTANT TONE RING, the contents of which are incorporated herein as if set out in full.

BACKGROUND

Antilock braking systems (ABS) are ubiquitous in vehicles today. In some countries, such as the United States, government regulations generally require heavy & medium duty vehicles to support some type of ABS.

Generally, ABS include a brake rotor that may be attached to a wheel hub or any other component that rotates with the wheel for rotation about an axis. The brake rotor for ABS includes a tone ring as part of the ABS vehicle speed sensor arrangement. The tone ring has a plurality of projections or teeth. The brake rotor is often cast iron or an iron alloy. The tone ring, which needs to be in part magnetic, may be cast along with the brake rotor to form an integral unit. Thus, the brake rotor and tone ring can be formed of the same iron or iron alloy. FIG. 1 shows a conventional brake rotor assembly 10 having a tone ring 12 integrally formed with the brake rotor part 11 during casting to make the brake rotor assembly 10 a singular construct including at least the brake rotor part 11 and the tone ring 12.

The tone ring forms a part of the ABS. The ABS also includes a sensor that may include a permanent magnet proximal the tone ring. As the tone ring rotates with the wheel, the teeth of the tone ring interfere with the magnetic field generated by the permanent magnet. As the teeth move through the magnetic field of the permanent magnet, an alternating current is produced that can be used to determine the wheel rotation and vehicle speed. Other forms of sensors are possible, and this is but one example.

The tone ring, and the teeth on the tone ring, are often exposed to the elements. Thus, when the tone ring is cast with the brake rotor, the teeth of the tone ring are formed of iron or an iron alloy. Thus, the teeth on the tone ring tend to corrode. The corrosion is exasperated in certain areas of the world due to chemical road treatments. For example, the northeast United States uses de-icing chemicals that tend to accelerate the corrosion of iron.

Several methods exist to limit the corrosion of the teeth on the tone ring. One method includes providing a tone ring comprising a different material completely separate from the cast brake rotor. This method is relatively unsatisfactory. For example, the separate tone ring increases the costs and complexity of the overall brake rotor and tone ring construct as well as the costs and complexities of coupling the separate tone ring to the brake rotor. Another method includes applying a corrosion resistant coating to the tone ring and, specifically, the teeth of the tone ring. The coatings are relatively unsatisfactory. For example, the corrosion resistant coatings tend to fail during use, limiting the effectiveness of the coating.

Thus, against this background, providing an improved brake rotor and tone ring construct is desirous.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, brake rotor assembly having a brake rotor portion and a dissimilar tone ring is provided. The brake rotor portion is formed of a first material, which may be a first metal, and the tone ring is formed by an additive process using a second material different from the first material, which may be a second metal. In certain aspects, the tone ring is formed using a corrosion resistant material. In certain aspects, the tone ring is formed from stainless steel. In certain embodiments, a bonding layer is provided between the brake rotor portion and the tone ring. The brake rotor portion in certain aspects may be an iron or an iron alloy.

In some aspects, the tone ring is formed by an additive process followed by a subtractive process. In one exemplary embodiment, the additive process is used to build up a cylindrical member having a sensor side surface opposite an engagement surface. The sensor side surface is formed into the sensor surface, e.g., the teeth of the tone ring, by a subtractive manufacturing process of channels between the teeth. The subtractive manufacturing method may include, among other things, machining the channels and etching the channels. Additionally, multiple subtractive techniques may be used, such as etching material from the cylindrical member followed by machining a final surface. The additive process to build up a cylindrical member followed by a subtractive process to form channels, and hence the teeth, forms the tone ring.

In one embodiment of the technology, the brake rotor is cast from a metal and has a rotor disc and an inner circumferential portion. The inner circumferential portion includes at least one side wall and an inwardly extending mounting flange forming a mounting surface. The inner circumferential portion may form a deposition surface to receive the additive material. The mounting surface comprises a plurality of bores, which allow the brake rotor assembly to be coupled to a wheel end assembly or wheel hub. The deposition surface, which may be chemically or mechanically treated, receives the tone ring by an additive manufacturing process. The additive manufacturing process builds the tone ring on the deposition surface from the engagement surface of the tone ring to the sensor surface of the tone ring. The sensor surface of the tone ring may comprise a plurality of protrusions that are formed from a magnetic material.

In some embodiments, the brake rotor portion is formed from a casting using a first metal. The cast brake rotor portion is provided to an additive printing manufacturing process. The additive printing manufacturing process machine, which may be a laser welding process, electron beam process, or the like, that builds a tone ring onto the brake rotor portion where the tone ring is formed from a material dissimilar to the brake rotor portion.

In certain aspects, the additive manufacturing process machine deposes a bonding layer on the deposition surface. The tone ring is built, layer by layer, on the bonding layer.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 is a picture of a conventional brake rotor assembly including a cast iron brake rotor part and an integrally formed cast iron tone ring part.

FIG. 2 a perspective partial view of a vehicle having a brake rotor assembly that incorporates the technology of the present application.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a tone ring for an antilock brake system (ABS). However, the technology described herein may be used with applications other than those specifically described herein. For example, the technology of the present application may be applicable to wheel end hubs or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
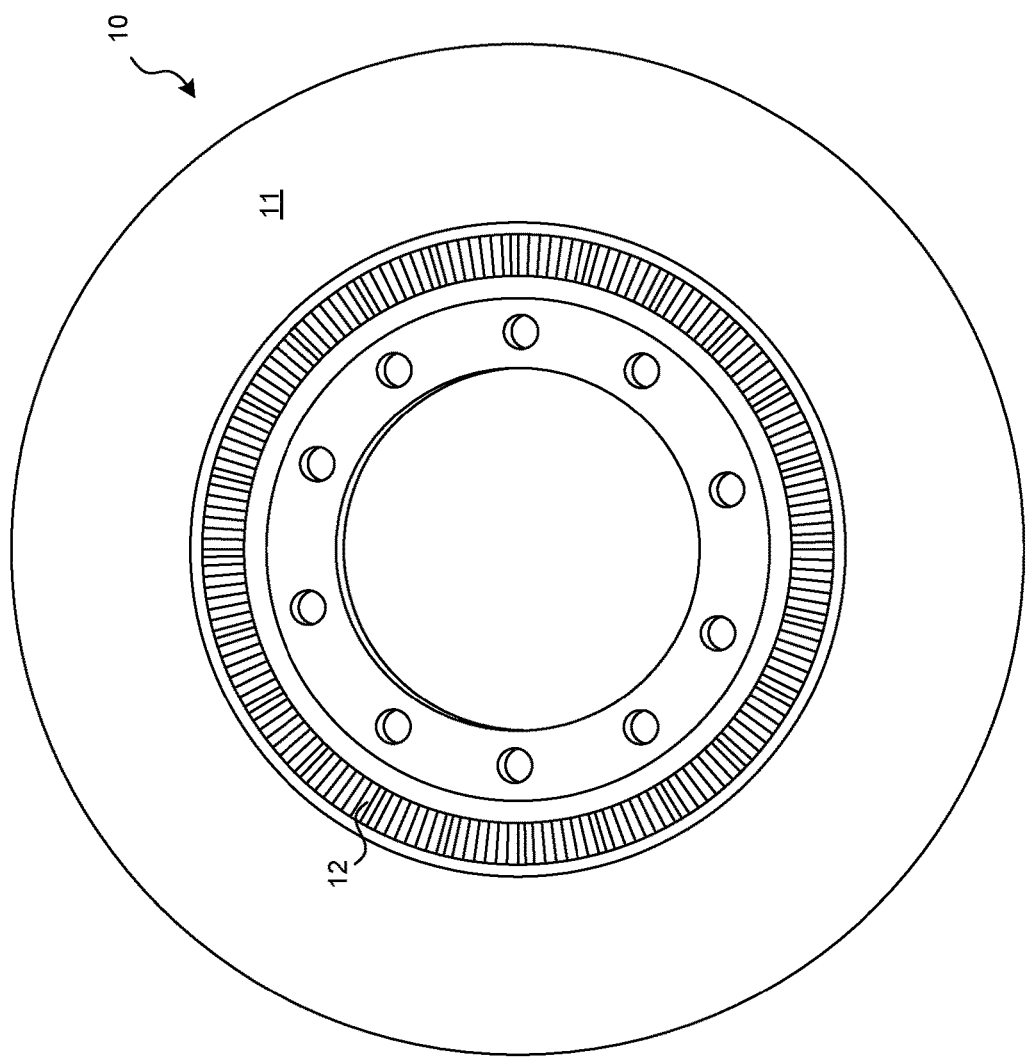
Figure 2:
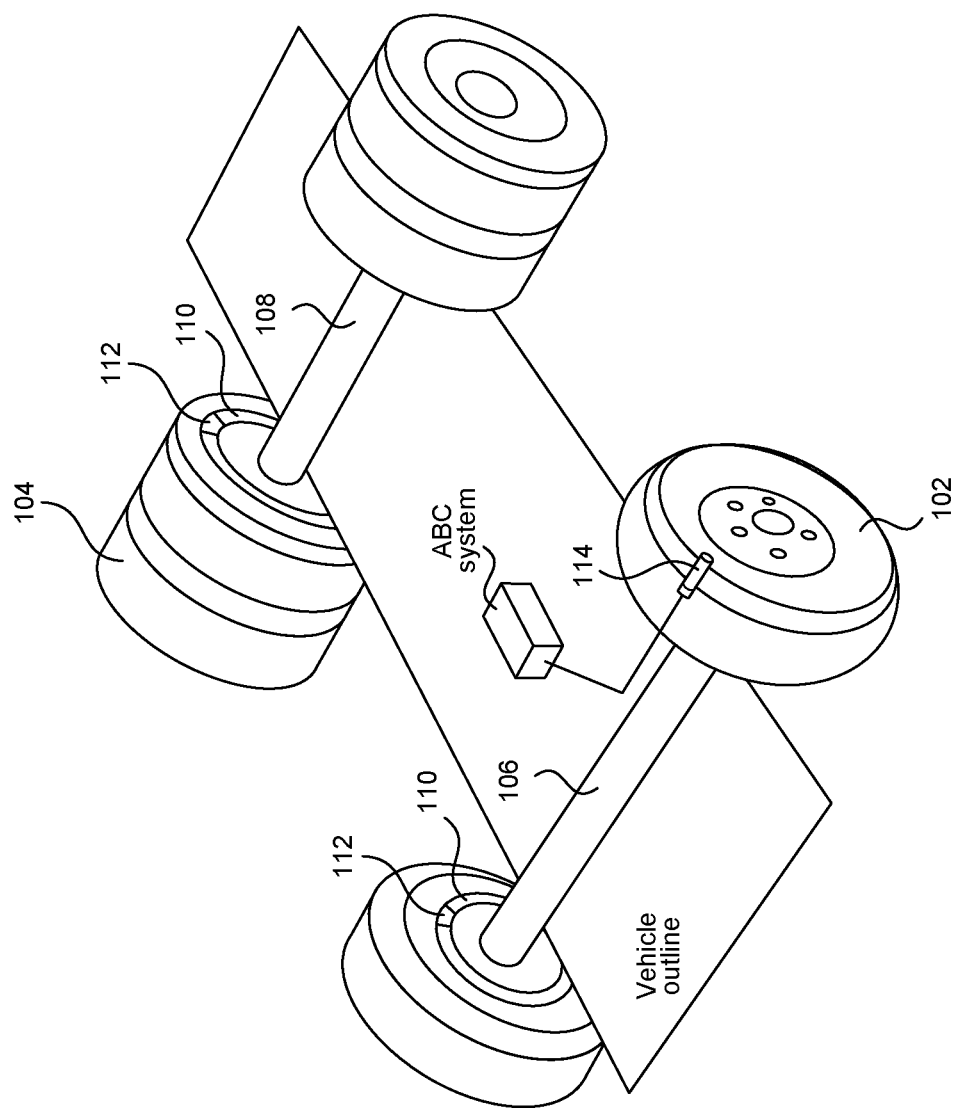

With reference now to FIG. 2, a skeleton view of a vehicle 100 being equipped with ABS is shown. The vehicle 100 has front wheels 102 and rear wheels 104. The front wheels 102 are mounted on a front axle 106. The rear wheels 104 are mounted on a rear axle 108. While t the rear wheels 104 are shown with two tires, the rear wheels 104 can be one tire or two tires.

The front wheels 102 and the rear wheels 104 are fitted with a brake system that include a brake rotor assembly 110 and calipers 112. The calipers 112 squeeze the brake rotor assembly 110 such that the friction between the brake rotor assembly 110 and brake pads on the calipers 112 apply a braking force to the wheels to stop the vehicle 100.

The ABS has a speed sensor 114 (only 1 of which is shown in the figure). The speed sensor 114 interacts with a tone ring on the brake rotor assembly 110 to generate a signal. The signal is used by the ABS system to identify the speed of the wheel to cause the calipers 112 to regulate brake force to the brake rotor assembly 110.

Figure 3:
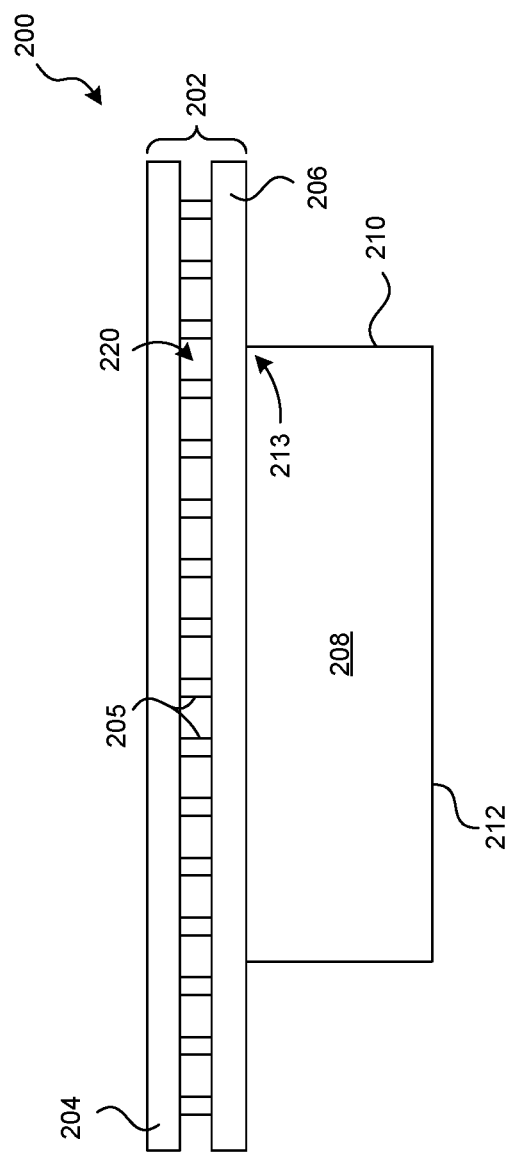
FIG. 3 is an elevation view of a brake rotor portion of a brake rotor assembly consistent with the technology of the present application.
Figure 4:
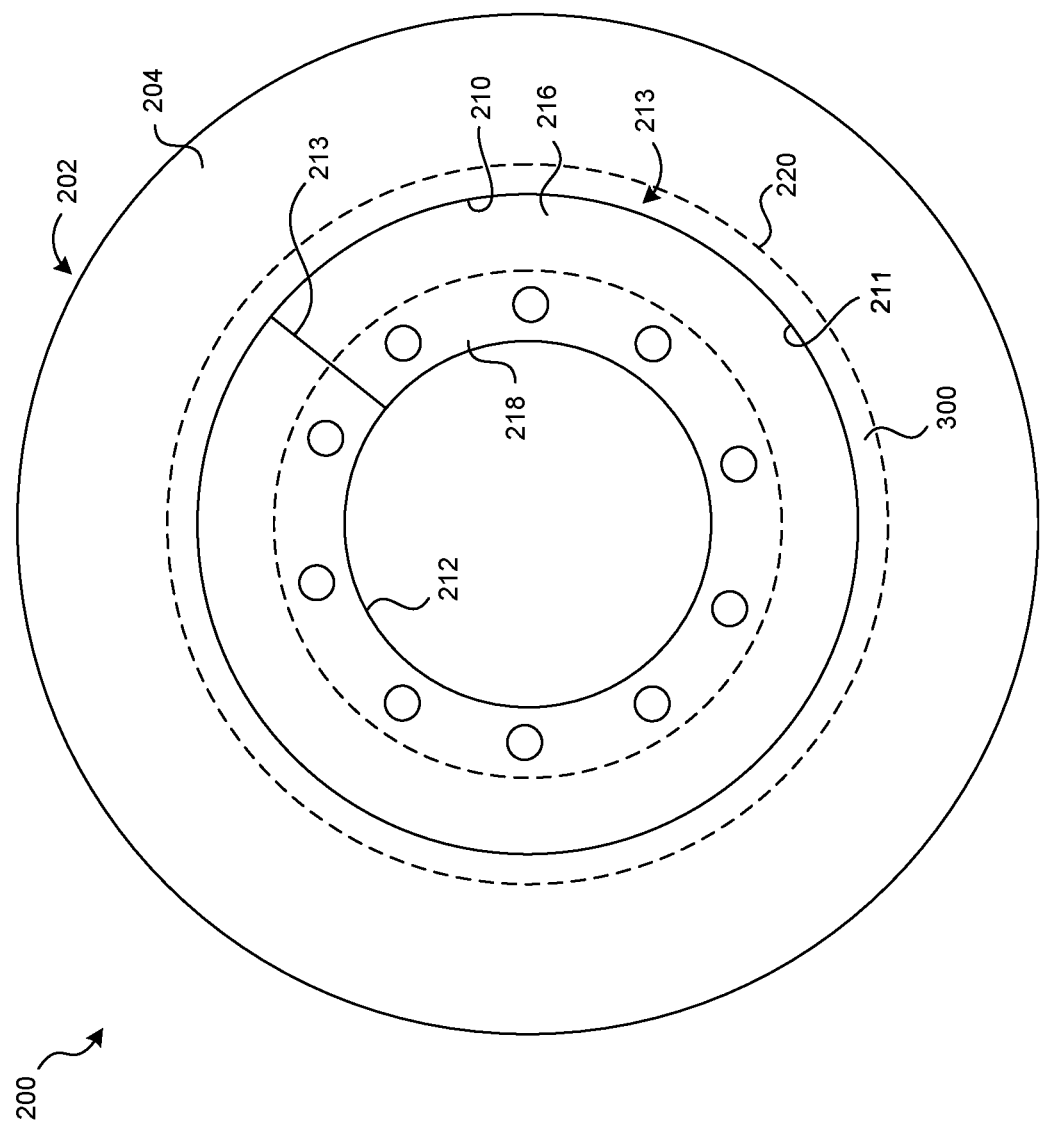
FIG. 4 is a top plan view of the brake rotor portion of FIG. 3 consistent with the technology of the present application.
Figure 5:
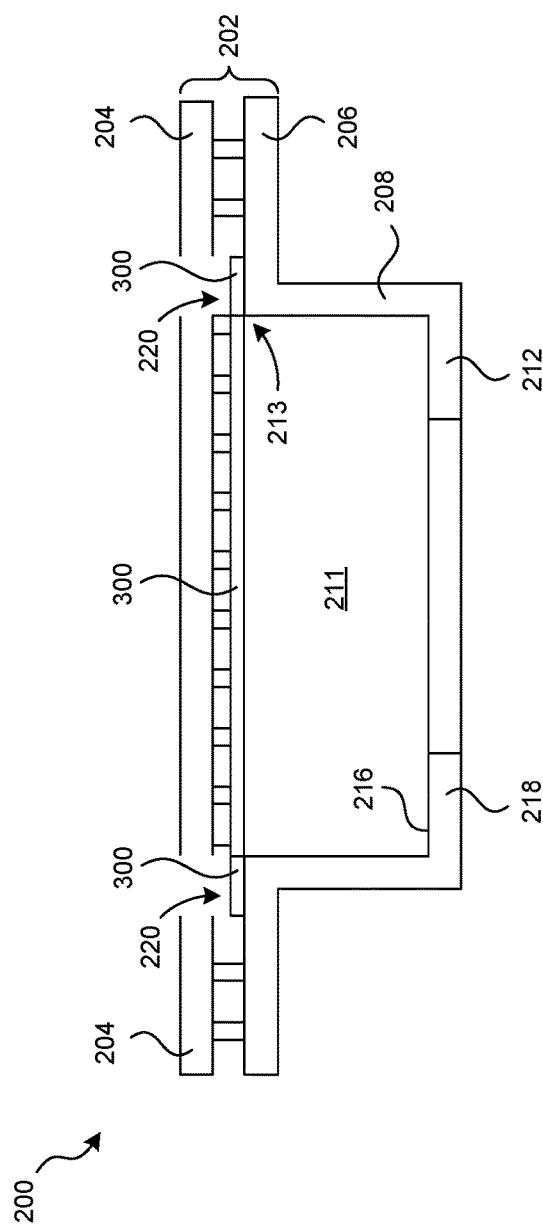
FIG. 5 is a cross sectional view of the brake rotor portion of FIG. 3 consistent with the technology of the present application.

A brake rotor portion 200 of the brake rotor assembly 110 is shown in FIGS. 3-5. FIG. 3 shows the brake rotor portion 200 in a side elevation view. FIG. 4 shows the brake rotor portion 200 from a top plan view. FIG. 5 shows a cross sectional view of the brake rotor portion 200.

The brake rotor portion 200 has a rotor disc 202, which is shown with opposed brake plates 204, 206. The opposed brake plates 204, 206 may be separated by a gap to allow venting of the device. Ribs 205 may reside between the opposed brake plates for support. The brake rotor portion 200 has an inner circumferential portion 208 integrally formed with the rotor disc 202. The inner circumferential portion 208 is formed by a sidewall 210, having an inner surface 211 (FIGS. 4 and 5), that is shown as cylindrical in this example but could be frustoconical and an inwardly extending mounting flange 212. The mounting flange 212 includes bores 214 (FIGS. 4 and 5), which are used to mount the brake rotor 110 to the wheel end or any other rotating component.

As best seen in FIG. 4, the inwardly extending mounting flange 212 has an annular radial width 213. The inner surface 216 of the inwardly extending mounting flange 212 has a mounting surface part 218, with the plurality of bores 214. The inner circumferential portion 208 has a deposition surface part 220 on a top edge 213 of the sidewall 210, which will be explained further below. The deposition surface part 220 is proximal rotor disc 202 and the brake plates 204, 206. The deposition surface 220 may be treated to receive deposited material.

Figure 6:
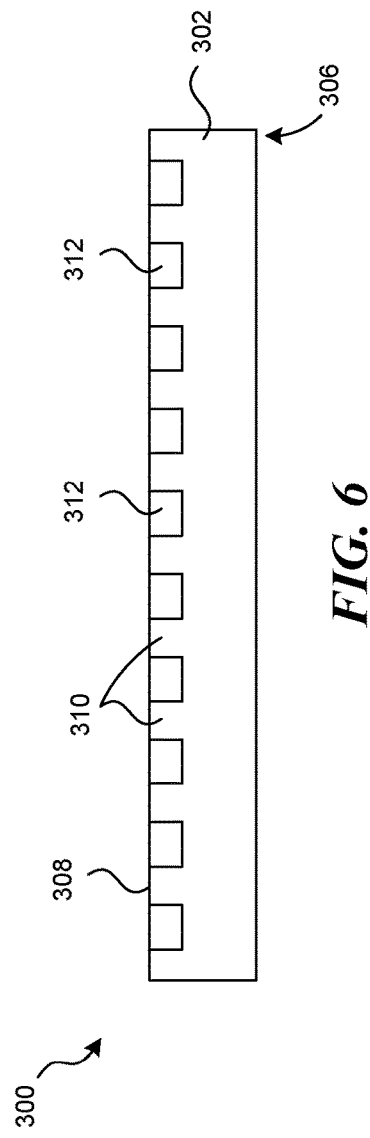
FIG. 6 is a view of a tone ring consistent with the technology of the present application.

FIG. 6 shows a tone ring portion 300 of the brake rotor assembly 110. The tone ring has an axially extending hollow body 302 operatively shaped to engage the top edge 213 of the inner surface 211 of the sidewall 210. The hollow body 302 has a cylindrical shape in this example to match the shape of the inner circumferential portion 208 of the brake rotor portion 200. The hollow body 302 has an engagement surface 306 that abuts the deposition surface 220 of the brake rotor portion 200. The hollow body 302 has a sensor surface 308 opposite the engagement surface 306. The sensor surface 308 is formed with a plurality of protrusions 310, which form the teeth of the tone ring. The hollow body 302, as will be explained below, is formed by an additive process such that the metal hollow body 302 may be a metal dissimilar to the metal of the brake rotor. The engagement surface 306 is coupled to the deposition surface 220 to form an integral unit. The engagement surface 306 may be coupled to the deposition surface 220 through a chemical or mechanical bond. In certain embodiments, the engagement surface 306 abutting the deposition surface includes providing a bonding layer (not specifically shown) between the engagement surface 306 and disposition surface 220. The bonding layer may be a nickel layer (or some other intermediate bonding material) deposited on the deposition surface 220. The engagement surface 306 is deposited on the nickel layer such that the nickel layer couples the tone ring 300 and the brake rotor portion 200 to form the brake rotor assembly 110. Other bonding materials may be used depending on the materials for the brake rotor portion 200 and the tone ring 300.

While described as an additive process, in certain embodiments, the tone ring 300 may be formed by a combination of an additive and subtractive process. With reference to FIG. 6, for example, a cylindrical member may be formed, such as a metal hollow body 302. As explained above, the plurality of protrusions 310 are formed by the additive process to form the teeth by building up the protrusion 310 on the metal hollow body 302. In a combination additive and subtractive process, the metal hollow body 302 would be formed by the additive process until the metal hollow body 302 was build up to a thickness or height. Next, a subtractive process, such as, for example, machining, would be used to remove portions of the metal hollow body 302 to form channels 312. The formation of the channels 310 by the removal or subtraction process forms the plurality of protrusions 310, which ultimately form the teeth or sensors of the tone ring 300. Other subtraction method could be used as well, such as, for example, etching to name but one. Additionally, combinations of subtraction processes could be used in certain embodiments.

Figure 7:
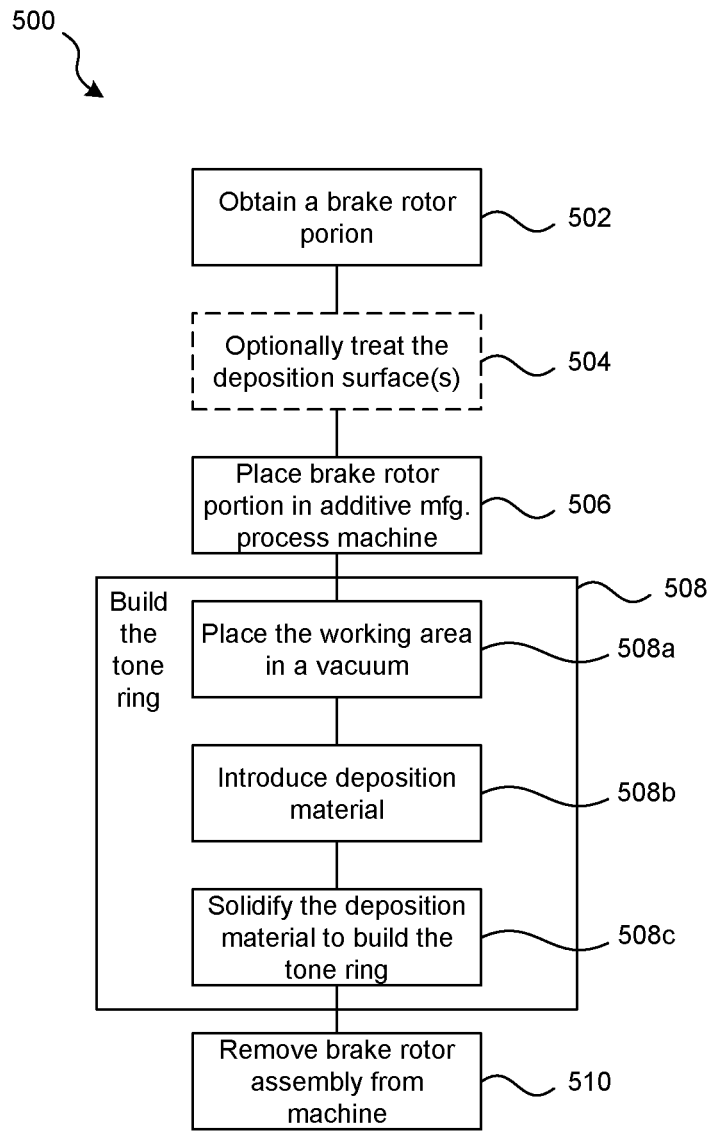
FIG. 7 is a flow chart illustrative of an exemplary method of making a brake rotor assembly consistent with the technology of the present application.
Figure 8:
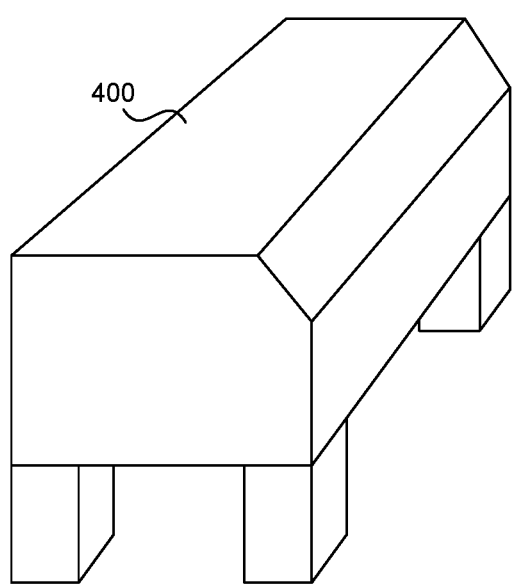
FIG. 8 is a view of an additive manufacturing process machine consistent with the technology of the present application.

Additive manufacturing of the tone ring 300 occurs subsequent to the casting of the brake rotor portion 110. The brake rotor portion 110 is provided to the additive manufacturing machine, such as, for example, an electron-beam additive manufacturing process machine 400 (see FIG. 8) or a selective laser sintering process machine to name but two additive metal manufacturing processes. FIG. 7 shows an additive manufacturing process 500 consistent with the technology of the present application. It should be understood that the additive manufacturing process 500 described herein is but one example and other additive processes or 3-D printing methods may be used to deposit metal on the deposition surface of the brake rotor to form the integrated unit.

First, the process begins by obtaining a brake rotor portion 200. The brake rotor portion 200 may be formed by casting an iron or iron alloy such that the brake rotor portion 200 includes the deposition surface 220 as described above, step 502. The deposition surface 220 may be treated (or pre-treated) to enhance the coupling of the tone ring 300 during the additive manufacturing process, step 504. The treatment (or pre-treatment) may be mechanical modifying of the deposition surface 220 or chemically activating the deposition surface 220, or the like.

Next, the brake rotor portion 200 is transferred to a working area of additive manufacturing process machine 400, step 506. The additive manufacturing process machine 400 would access an instructional file to control the working area environment to build up the tone ring 300, step 508. For electron beam additive process machines, the working area is placed in a vacuum condition, step 508a. The deposition material is introduced to the working area environment, step 508b. For example, a stainless-steel powder may be injected into the working area vacuum. The additive manufacturing process machine 400 would cause an electron beam source to solidify the powder deposition material directly to the deposition surface part 214 building up the tone ring 300 layer by layer from the engagement surface 306 to the sensor surface 308, step 508c. At the end of the additive manufacturing process, the brake rotor assembly 110, which includes the coupled brake rotor portion 200 and the tone ring 300, would be formed such that it can be removed from the additive manufacturing process machine 400. In certain aspects, the additive process as described would be followed by a subtraction process as described above, but the step is not specifically shown in FIG. 7. The brake rotor assembly 110 may be finished as required by the final use.

As described above, the top edge 213 of the sidewall 210 has the deposition surface 220. However, in certain embodiments, the deposition surface 220 may be build up to form a shoulder or raised platform on which the tone ring 300 may be built. This would generally require lower additive manufacturing costs, as at least one advantage. In certain embodiments, the deposition surface 220 may be sufficiently raised such that the tone ring 300 comprises forming the plurality of protrusions 310, which form the teeth of the tone ring, directly on the deposition surface 220.

Using the technology described herein, a brake rotor assembly can be formed with the brake rotor portion being of a material dissimilar to the tone ring. In other words, the brake rotor portion is made from a first material and the tone ring is made from a second material dissimilar to the first material. In one embodiment of the technology, the brake rotor is cast from iron or an iron alloy and the tone ring is additively built from steel, such as stainless steel. Other metals and/or composites are usable as well.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method for producing a brake rotor assembly having a brake rotor portion and a tone ring, the method comprising:

obtaining a brake rotor portion of a brake rotor assembly made from a first material, the brake rotor portion comprising a rotor disc and an inner circumferential portion formed with the rotor disc wherein a top edge of the inner circumferential portion forms a deposition surface, the inner circumferential portion including an inwardly extending mounting flange;

placing the brake rotor portion into a work station of an additive manufacturing process machine;

building up a cylindrical member on the deposition surface of the brake rotor using the additive manufacturing process machine from a second material dissimilar to the first material; and removing material from the cylindrical member to form a plurality of channels and a corresponding plurality of protrusions to form the tone ring of an integrated brake rotor with an integral tone ring.

2. The method of claim 1 wherein the step of building up the tone ring comprises using an electron beam deposition.

3. The method of claim 1 wherein the step of building up the tone ring comprises using a laser deposition.

4. The method of claim 1 wherein the first material is a first metal and the second material is a second metal.

5. The method of claim 4 wherein the first metal is selected from a group of metals consisting of: iron, iron alloy, or a combination thereof; and the second metal is selected from a group of metals consisting of: steel or stainless steel, or a combination thereof.

6. The method of claim 1 wherein the second material is a corrosion resistant material.

7. The method of claim 6 wherein the second material is magnetic.

8. The method of claim 1 further comprising the step of treating the deposition surface of the brake rotor portion to facilitate the buildup of the tone ring comprising mechanical modification of the deposition surface.

9. The method of claim 8 wherein the step of treating the deposition surface of the brake rotor portion to facilitate the buildup of the tone ring comprising chemical treating of the deposition surface.

10. The method of claim 1 wherein the step of removing the material comprises machining the cylindrical member.

11. The method of claim 1, further comprising the step of depositing a bonding layer onto the deposition surface using the additive manufacturing process machine.

12. The method of claim 11, wherein the bonding layer comprises a layer of nickel.

13. A method for producing a brake rotor assembly having a brake rotor portion and a tone ring having a plurality of protrusions forming teeth of the tone ring, the method comprising:

providing a brake rotor portion of the brake rotor assembly made from a first material, the brake rotor portion comprising a rotor disc and an inner circumferential portion having a raised platform having a deposition surface; and;

building only the teeth of the tone ring directly on the deposition surface from a second material dissimilar to the first material using an additive manufacturing process;

wherein the tone ring consists solely of the teeth built from the second dissimilar material.

14. The method of claim 13, wherein the second material is initially in a powdered form, and the step of building the tone ring directly on the deposition surface comprises solidifying the second material directly to the deposition surface of the brake rotor portion.

15. The method of claim 13, wherein the additive manufacturing process is selected from the group comprising a laser welding process, a laser sintering process, an electron beam process, and a 3-D printing process.

16. The method of claim 13, wherein the step of building only the teeth of the tone ring directly on the deposition surface comprises solidifying the teeth directly to the deposition surface.

* * * * *